INVENTOR.
BEN A. HARRIS
ATTORNEYS

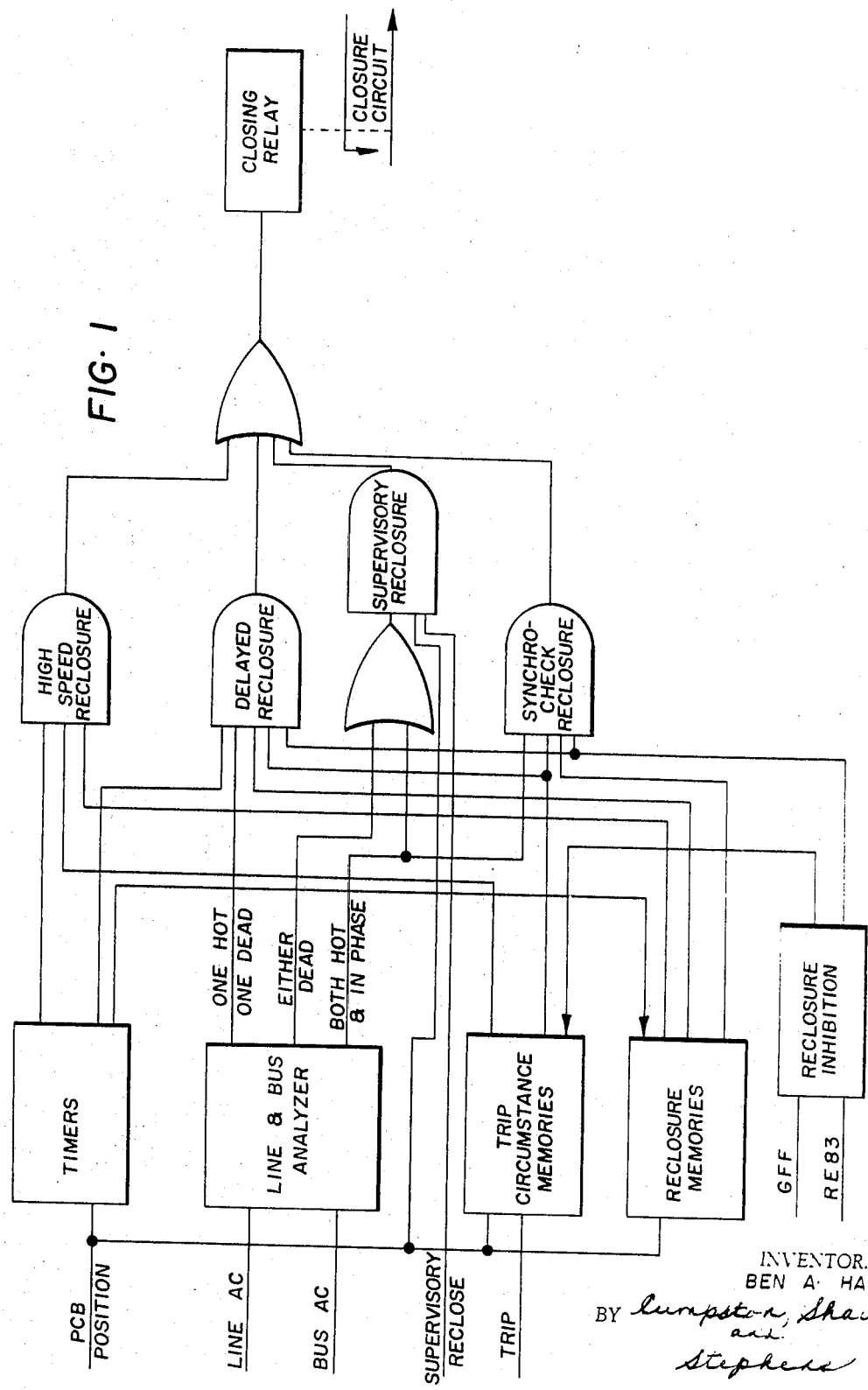

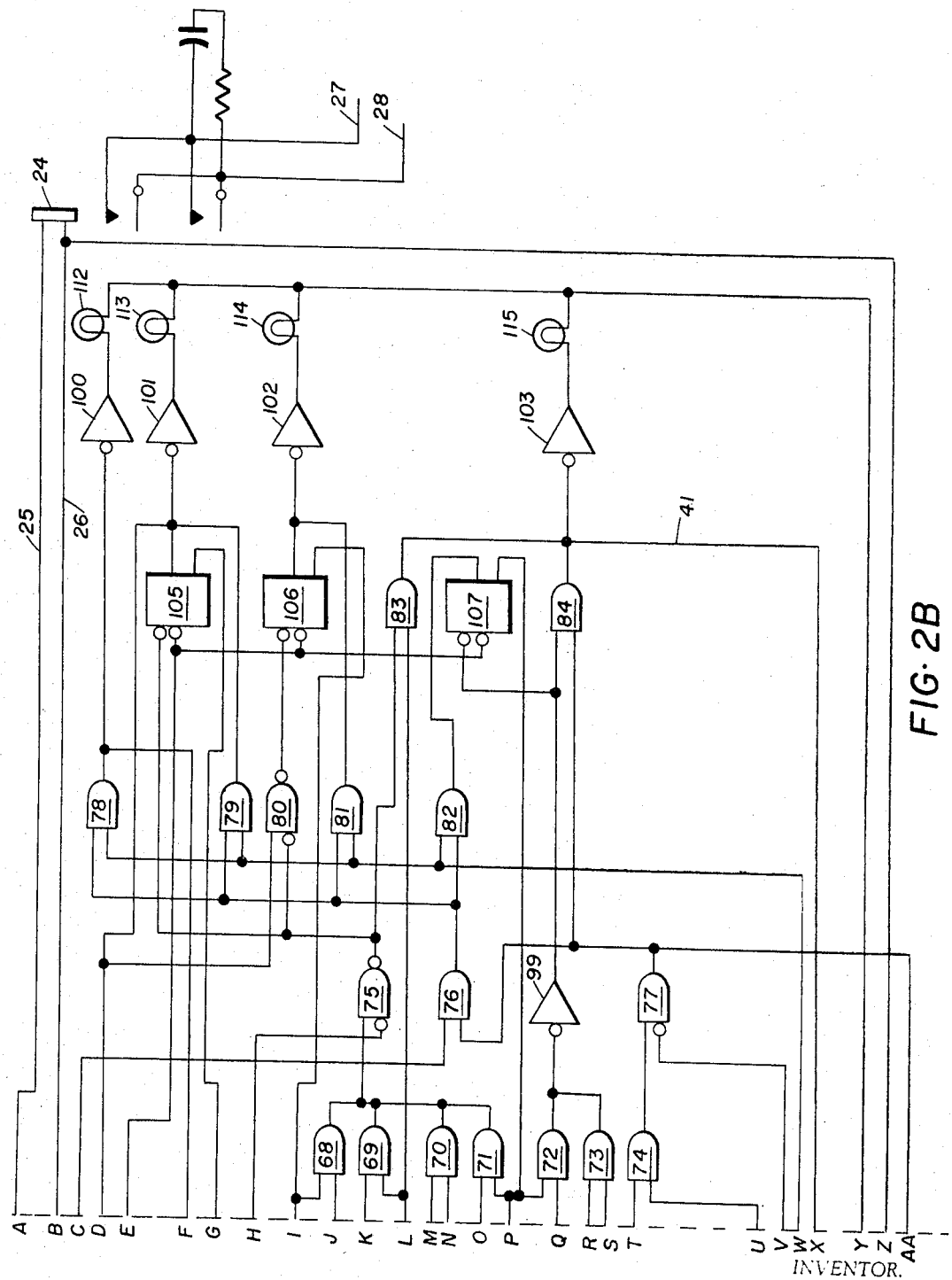

INVENTOR.
BEN A. HARRIS
BY
ATTORNEYS

INVENTOR.
BEN A. HARRIS

BY Cumpston, Shaw
       and
    Stephens

ATTORNEYS

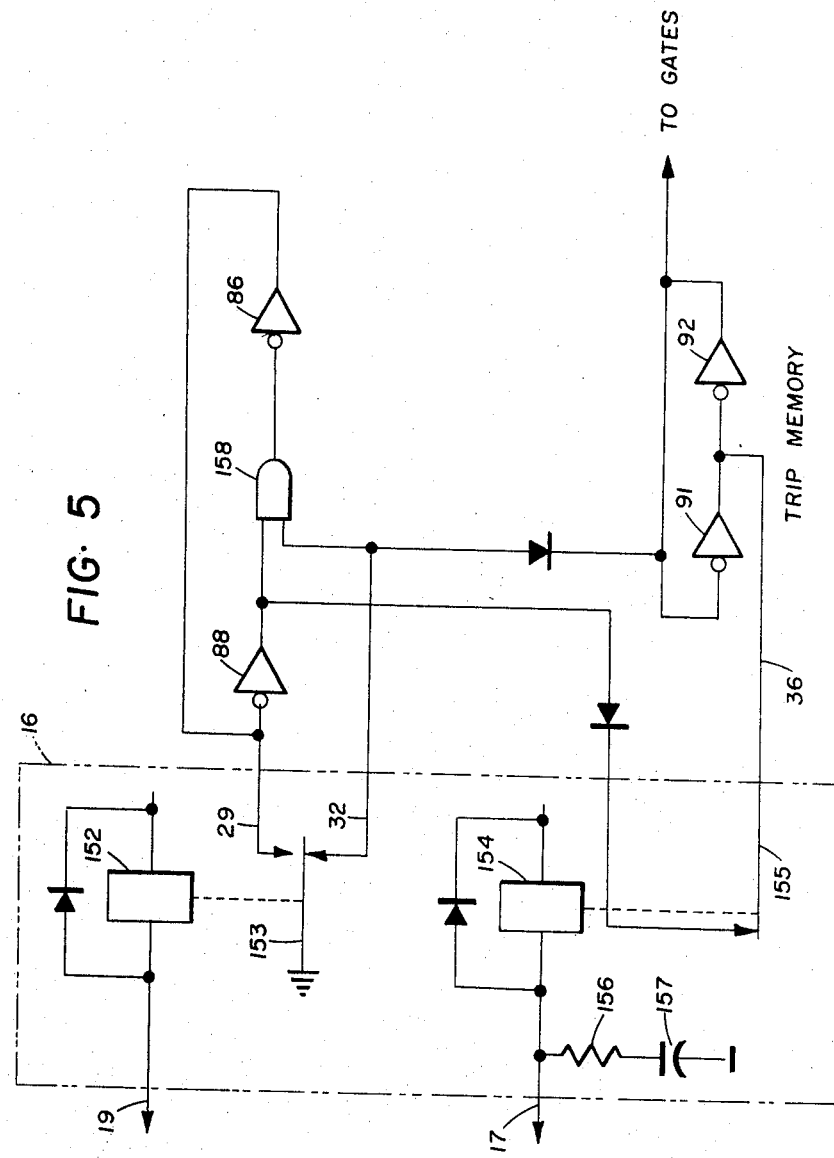

United States Patent Office 3,471,749
Patented Oct. 7, 1969

3,471,749
SYSTEM FOR CONTROLLING AUTOMATIC
RECLOSURE OF A POWER CIRCUIT
BREAKER
Ben A. Harris, Rochester, N.Y., assignor to Rochester
Instrument Systems, Inc., Rochester, N.Y., a corporation of New York
Filed May 3, 1967, Ser. No. 635,851
Int. Cl. H02h 7/20, 5/00
U.S. Cl. 317—23                                              48 Claims

ABSTRACT OF THE DISCLOSURE

A solid state logic system controls reclosure of a power circuit breaker at an electric power transmission station. The system receives input signals as to a trip of the breaker, the circumstances of the trip, power conditions, and reclosure inhibition signals, and includes memories for trip circumstances and reclosure attempts, a power condition analyzer of energization and phase, reclosure timers, and-gates and or-gates for defining reclosure conditions, and a relay to initiate a reclosure. The system is reset after a successful reclosure, lamps indicate reclosure attempts, and a supervisory reclosure is implemented on proper conditions. The system is powered by station batteries, its logic can be altered by changing connections in a plug to meet a variety of power requirements, and the system can control several related circuit breakers.

---

This invention relates to automatic reclosure of electric power circuit breakers. Electric power transmission systems use circuit breakers to protect equipment from power overloads from various faults such as lightning, grounding, etc. Such circuit breakers are arranged in power transmission systems in various ways such as connecting a line and a bus or connecting two busses. For many trips of such circuit breakers, automatic reclosure is possible.

Previously known systems for controlling reclosure of power circuit breakers have been electro-mechanical devices using motor-driven cam switches, pneumatic and thermal timers, relays, etc., and these devices have been expensive to build, install, and maintain, unreliable in service, and practically limited as to speed and capability of responding to a variety of circumstances.

The objects of this invention include, without limitation, an automatic power circuit breaker reclosure system that:

overcomes the deficiencies of prior art systems;
uses a high speed, solid state logic network;
meets all the reclosure needs of existing power transmission systems;
is readily variable as to logic conditions for reclosure;
uses station battery power rather than independent AC;
is fast, reliable, and accurate;
is economical to install, service, or modify;
indicates reclosure actions taken; and
is a compact single package that is commercially competitive with existing equipment.

These and other objects of the invention will be apparent hereinafter from the specification which describes the invention, its use, operation, and preferred embodiments, from the drawings, which constitute a part of the disclosure, and from the subject matter claimed.

Generally, the inventive system for controlling automatic reclosure of a power circuit breaker is a solid state logic network that receives input signals representing the circuit state of the breaker and the circumstances of a trip of the breaker, and includes a bi-stable trip memory for trip circumstances, a bi-stable memory for reclosure attempts by the system, and an and-gate for initiating automatic reclosure if signals represent that the circuit breaker is open, and automatic reclosure is allowable, and there has not been a previous attempt by the system to automatically reclose the breaker. Many logic refinements can be added to this basic arrangement. Suitable inputs, memories, and and-gates or or-gates can be added to actuate a high speed reclosure if such is acceptable, followed by a delayed attempt to reclose if either of the power elements connected by the circuit breaker are dead, a reclosure if after a phase synchronization check if both the power elements connected by the circuit breaker are hot, a further delayed reclosure after a first delayed reclosure has been unsuccessfully attempted, a reclosure by supervisory action if power element conditions permit, a reset of the system either on input or upon successful reclosure, and indications of reclosure attempts.

In the drawings:

FIG. 1 shows a simplified logic diagram with the illustrated preferred embodiment of the inventive automatic reclosure system for a power circuit breaker;

FIGS. 2A and 2B show respective left-and right-hand portions of a complete schematic logic diagram for the inventive automatic reclosure system for a power circuit breaker;

FIG. 5 shows a schematic logic diagram corresponding to a fragment of FIG. 2A and showing trip memory setting.

The illustrated preferred embodiment of the inventive automatic power circuit breaker reclosure system has been selected as showing a great many of the logic conditions and options available with the inventive system. Not all of the illustrated system is necessary in practicing the invention, as shown in the subject matter claimed. The illustrated system will be described in detail, but it should be borne in mind that many subcombinations and portions of the illustrated system fall within the broader aspects of the invention as well as variations and refinements that can be added to the disclosed system.

Figure 2A:
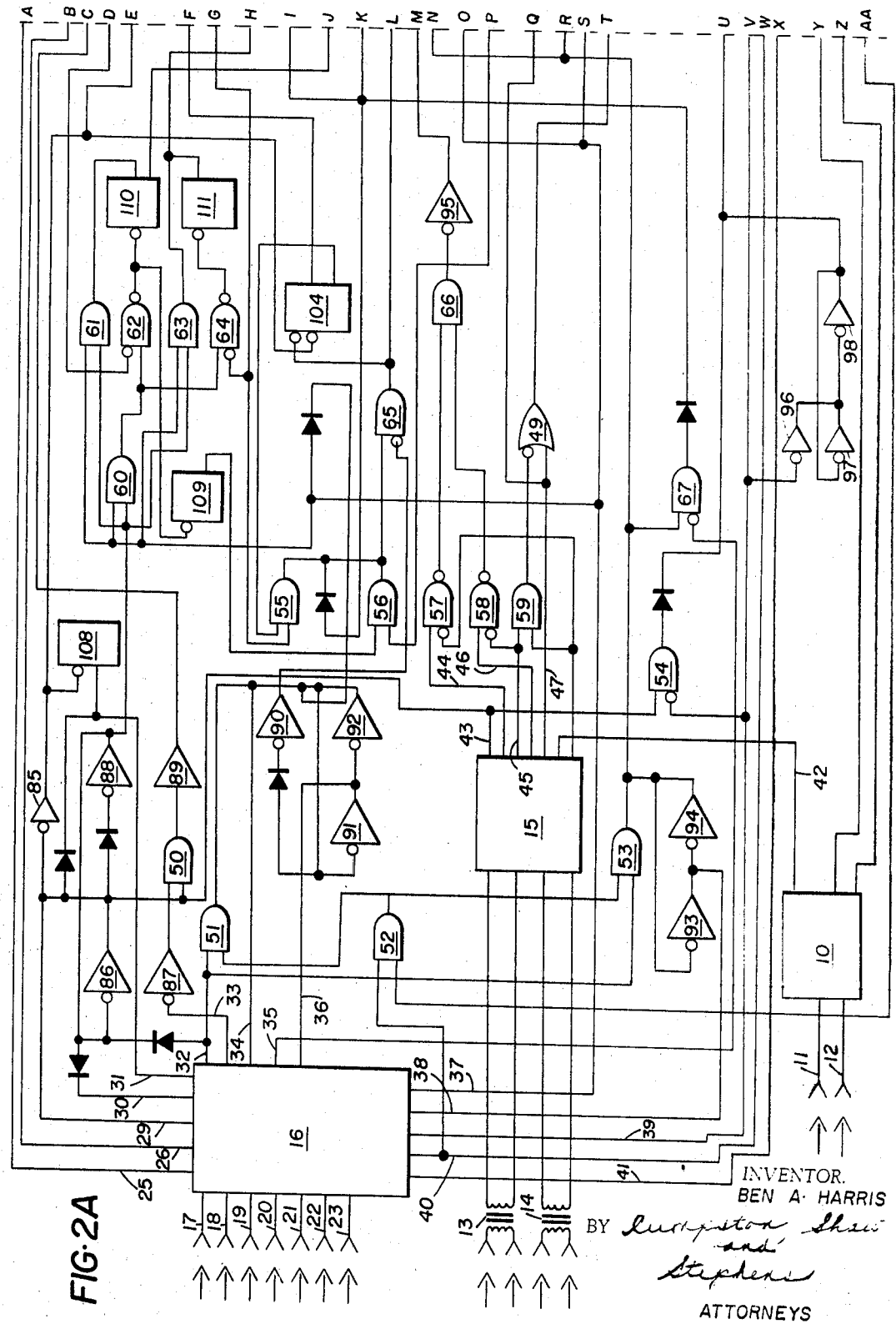

Throughout the drawings, corresponding parts have been given the same reference numbers. The lines connecting FIGS. 2A and 2B are identified by corresponding letters of the alphabet for convenience in tracing circuitry. Negative logic is used in the illustrated system so that a logic one is represented by a negative potential and a logic zero is represented by ground. Inverters are used as appropriate so that various gates are enabled by negative or ground inputs as desired. Those skilled in the art will readily understand from the illustrated circuits various ways that the implementation of the logic can be achieved.

The illustrated preferred embodiment of the inventive automatic system for reclosing a power circuit breaker (PCB) is connected between a line and a bus at a station in a power transmission system. The inventive system can be used for reclosing circuit breakers arranged in other ways in power transmission systems, however.

The general block diagram for the inventive reclosing system is shown in FIG. 1. Inputs to this system are shown along the left side of FIG. 1 and include PCB position, line AC, bus AC, a supervisory reclosure, a trip circumstance signal, and reclosure inhibition signals for ground frequency failure (GFF) or pilot relaying off (RE 83). The GFF and RE 83 signals are known and used in the power transmision art, and they relate to breaker reclosure.

These inputs lead to analyzing and control circuits shown in the first vertical row of blocks, and including timers, a line and bus analyzer, trip circumstance memories, reclosure memories and reclosure inhibition. Outputs of the analyzing and control blocks are combined in and-gates and or-gates to produce high speed reclosure, delayed reclosure, supervisory reclosure, and synchrocheck reclosure functions. These functions are ORed together to operate a closing relay that initiates reclosure of the breaker.

The timer block represents four R-C timers three of which control the delay intervals of a high speed reclosure, a first delayed reclosure, and a second delayed reclosure. The fourth timer is triggered by closing of the breaker and controls the duration of a successful reclose reset. If the breaker remains closed during the reset interval, a reset pulse is produced which resets the reclosure memories to ready the system for a new sequence.

The line and bus analyzer decides whether the line and bus are hot or dead or both hot and in phase, and these decisions determine whether delayed reclosures or a synchrocheck reclosure is attempted. These decisions also effect the implementation of the supervisory reclosure.

The trip memories block includes an automatic trip memory that is set in response to an automatic trip of the breaker. An automatic trip is a prerequisite for any automatic reclosure by the system, and setting of the automatic trip memory is necessary to enable automatic reclosing. A permissive trip memory enables high speed reclosing. Both memories are reset whenever the breaker closes.

Reclosure memories remember the type of reclosures attempted by the system within any sequence. Four reclosure memories are included for high speed reclosure, first delayed reclosure, second delayed reclosure, and synchrocheck reclosure. These memories are reset by the reclosure timer is the breaker remains closed for a predetermined interval. The reclosure memories prevent reclosures from being automatically repeated, and the first delayed reclosure memory setting is required to enable a second delayed reclosure attempt. Setting of the synchrocheck reclosure memory inhibits all automatic reclosing.

The GFF and RE 83 inputs prevent any setting of the permissive trip memory and thus prevent any high speed reclosure. In addition, a GFF input inhibits synchrocheck and delayed reclosing.

The logic represented schematically in FIG. 1 can be expressed in words according to the following table.

HIGH SPEED RECLOSURE

A high speed reclosure is actuated if the following conditions are all true:
(1) The PCB has been open for an adjustible predetermined interval from 2 to 36 cycles.
(2) The trip of the PCB was one for which a high speed reclose is allowable.
(3) No automatic reclosure has been attempted.
(4) No GFF inhibition signal has been present while ther breaker was open.
(5) No RE 83 inhibition signal has been present while the breaker was open.

DELAYED RECLOSURE

A first delayed reclosure is actuated if the following conditions are all true:
(1) The PCB has been open for an adjustable predetermined interval of from 3 to 60 seconds.
(2) The trip of the PCB was automatic.
(3) No previous first delayed reclosure has been attempted.
(4) No GFF inhibition signal has been present while the PCB was open.
(5) Either the bus is hot and the line is dead or the bus is dead and the line is hot.

SECOND DELAYED RECLOSE

A second delayed reclosure is actuated if the following conditions are true:
(1) Conditions 1, 2, 4, and 5 for a first delayed reclose are met.
(2) The PCB has been open for an adjustable predetermined interval of from 3 to 60 seconds.
(3) A first delayed reclosure has been attempted.
(4) No second delayed reclosure has been attempted.

SYNCHROCHECK RECLOSURE

A synchrocheck reclosure is actuated if the following conditions are all true:
(1) The PCB is open.
(2) A trip of the PCB has been automatic.
(3) No previous synchrocheck reclosure has been attempted.
(4) No GFF inhibition signal has been present while the PCB was open.
(5) The line and bus are both hot and in phase.

SUPERVISORY CLOSURE

A supervisory reclosure is actuated when indicated by input if the following conditions are true:
(1) The PCB is open.
(2) Both the line and the bus are hot and in phase, or either the line or the bus is dead.

In addition, the system can be reset on an input, a supervisory or manual trip inhibits all automatic reclosures, and a supervisory or manual closure reinstates the automatic reclosing system.

The reclosing sequences of the illustrated system can begin following a manual close or about one second after a supervisory close. Two reclosing sequences are provided depending on line conditions. If the line is dead and the bus is hot or the line is hot and the bus is dead, the applicable reclosing sequence is high speed reclose, first delayed reclose, and second delayed reclose. If the trip does not call for a high speed reclose, the sequence begins with the first delayed reclose. The high speed reclose delay is adjustable from 2 to 36 cycles, and the first and second delayed recloses are adjustable from 3 to 60 seconds after the breaker opens. If an automatic trip occurs on a second delayed reclose, the breaker stays open as long as the states of the line and the bus do not change.

If the line and bus are both hot and in phase, the applicable sequence is high speed reclose and synchrocheck reclose. If the trip does not call for high speed reclose, only a synchrocheck reclose is made. If an automatic trip occurs on a synchrocheck reclose, the breaker stays open until closed manually or by supervisory control.

Referring especially to the greater details of FIGS. 2A and 2B, the illustrated reclosure system is preferably powered by DC from station batteries input through lines 11 and 12 to a DC converter 10 which provides suitable DC voltages for use with the logic system. Line and bus AC are input through respective isolation transformers 13 and 14 to the line and bus analyzer 15. Analyzer 15 is shown in greater detail in FIGS. 3 and 4. Other inputs shown along the lift side of FIG. 2A enter isolation module 16. Module 16 contains conventional isolation circuitry including dry reed relays to isolate input signals to the logic system. A magnetic driver circuit powers the delays all as well known to those skilled in the art to isolate the system from the inputs and the power station electrical environment. The inputs to isolation module 16 through lines 17–23 are as follows:

a permissive trip signal through line 17 signifies that a high speed reclosure is allowable;
an automatic trip signal through line 18 signifies that a trip was automatic, and hence automatic reclosure is allowable;
a signal through line 19 represents the circuit state of the breaker—presence or absence of a signal in line 19 signifying whether the power circuit breaker is open or closed;
a signal through line 20 signifies a supervisory reclosure;
an RE 83 signal in line 21 inhibits high speed reclosure;

a GFF signal in line 22 inhibits all automatic reclosure; and a signal in line 22 resets the logic system.

Closing relay 24 at the upper right of FIG. 2B is energized through lines 25 and 26 from isolation module 16 to complete a circuit in lines 27 and 28 for initiating reclosure of the power circuit breaker (not shown).

The other outputs from isolation module 16 include: line 29 in which a logic one signal represents that the breaker is open; line 30 leading to a trip memory; line 31 in which a signal actuates timers; line 32 in which a signal represents that the breaker is not open; line 33 in which a pulsed signal is transmitted to memories; line 34 in which a signal represents lack of an RE 83 inhibition signal; line 35 leading to a trip memory; line 36 in which a signal sets a permissive trip bistable memory; line 37 in which a logic one signal represents lack of a GFF inhibition signal; line 38 in which an automatic trip is signalled; line 39 in which a supervisory reclosure is signalled; line 40 in which a reset is signalled; and line 41 in which a reclosure is signalled.

Inputs to line and bus analyzer 15 include line AC and bus AC from respective isolation transformers 13 and 14, DC power through line 42 from DC converter 10, and a signal in line 43 signifying that the breaker is open. The outputs from line and bus or the outputs from analyzer 15 are as follows: line 44 in which a signal represents that the line is hot; line 45 in which a signal represents that the line is not dead: line 46 in which a signal represents the bus is hot; line 47 in which a signal represents the line and bus are both hot and in phase; and line 48 in which a signal represents the bus is not dead.

Before tracing various reclosure actuations through the illustrated logic system elements shown in FIGS. 2A and 2B for such system are identified as follows:

an or-gate 49, many and-gates 50–84, inverters 85–103, bi-stable reclosure memory means 104–107, R–C delay timers 108–111, and many unnumbered diodes arranged in appropriate places.

The system contains several memories that are bi-stable in the sense of having at least two stable states. Additional stable states for such memories are possible but not required within the spirit of the invention. Reclosure memories 104–107 are conventional bi-stable memory devices, and additional memories are formed by pairs of inverters connected output to input. For example, inverters 86 and 88 form a bi-stable memory, and also inverters 93 and 94 are connected to form a bi-stable memory. If one transistor of such a pair of inverters conducts, then the other does not, and each maintains the other transistor in its existing state. If the output is grounded by a relay contact for example, inverters switch to their opposite stable state and maintain that state until the output is again grounded.

The system contains flip-flops and timers having conventional capacitor edge-triggering, and these circuits are set by isolation relays in isolation module 16. Since relays are prone to contact chatter, and since dynamic switching is accomplished by such relays, the effects of contact chatter are eliminated in the inventive system. This is best illustrated in FIG. 5.

Input 19 to isolation module 16 represents breaker position and actuates isolation relay 152 to move contact arm 153 between transfer contacts in circuit with lines 29 and 32 leading from isolation module 16. A pair of inverters 86 and 88 corresponding to inverters 86 and 88 in FIG. 2A are connected output to input in a bi-stable manner in circuit with lines 29 and 32 to form a contact memory. Gate 158 interposed between inverters 88 and 86 permits the normally closed contact in line 32 to affect the position of the contact memory, but prevents the memory position from feeding back into the relay contact circuit. The connection of inverters 86 and 88 in FIG. 2A is somewhat different, but the same in function since the inverters in either arrangement are connected in a bi-stable manner to act as a memory and in circuit with lines 29 and 32.

When contact arm 153 of relay 152 is in the normally closed position shown corresponding to a closed breaker, inverters 86 and 88 are set in correspondence to this state. When the breaker trips to operate relay 152, contact arm 153 moves from line 32 to line 29. On first closure of the normally open contact in line 29, bi-stable inverters 86 and 88 are switched to the opposite state in memory of this event and subsequent opening and closing of the contact in line 29 does not change the memory so long as the contact in line 32 is not closed.

The inventive system contains two trip memory bi-stable inverter pairs for remembering the circumstance of a trip of the breaker. The setting of these memories is shown in FIGS. 2A and 5. With the logic of the system reset in normal operating condition, inputs to module 16 signal an event to be acted on. Trip signals in lines 17 and 18 are initiated by circuitry for automatically tripping the breaker, but the breaker position signal in line 19 is responsive to the mechanical position of the breaker and thus signals an open breaker a short interval after trip circumstances are signalled.

The inventive system contains two trip circumstances memories. A permissive trip memory is formed by inverters 91 and 92 connected in a bi-stable manner, and an automatic trip memory is formed by inverters 93 and 94 connected in a bi-stable manner. These memories are set as best shown in FIG. 5.

The input to isolation module 16 that is illustrated in FIG. 5 is a permissive trip input in line 17 arranged for setting the permissive trip memory formed of inverters 91 and 92. An auto-trip input in line 18 is arranged in a similar manner for setting auto-trip memory inverters 93 and 94.

A permissive trip signal on line 17 actuates the isolation relay 154 for a permissive trip, to move relay contact arm 155 into engagement with a contact to provide an output in line 36 leading from module 16 to bi-stable inverters 91 and 92. A resistor 156 and a capacitor 157 are arranged to hold relay 154 in a closed position for a short interval after actuation to insure that relay 154 is closed in response to a permissive trip signal at the slightly subsequent time of opening of the breaker and operation of its isolation relay 152.

Bi-stable inverters 91 and 92 are held from any change of state by grounds in either line 29 or 32 so that the permissive trip memory can be set in response to a permissive trip input only during the interval between contact arm 153 of relay 152 leaving engagement with line 32 and reaching engagement with line 29. When the breaker opens and contact arm 153 of relay 152 leaves its normally closed contact in line 32, the output of inverter 92 goes negative to a logic one condition to memorize a permissive trip if an output in line 36 signifies that permissive trip signal is present. When the normally open contact in line 29 is closed by contact arm 153 of relay 152, inverters 86 and 88 are switched to a logic one output preventing any further changes in the state of bi-stable inverters 91 and 92. Thus, the permissive trip memory can be set only during the interval during which the breaker's isolation relay is moving between its transfer contacts. This discriminates against spurious operation of the logic system and in effect eliminates chances of any automatic reclosing after a supervisory trip.

In a similar manner, an automatic trip signal input in line 18 to isolation module 16 operates a corresponding isolation relay to set the automatic trip memory inverters 93 and 94 that can be set only during this same interval.

High speed reclosure is controlled by and-gates 55, 56, and 65. The permissive trip memory inverters 91 and 92 are set as described above to produce an output through inverter 90 enabling the lower input of and-gate 65. Lack of any RE 83 inhibition signal produces an output in line 34 from module 16, which is a further condition of enabling the lower input to gate 65 via inverter 90. Opening of the breaker sets bi-stable contact memory inverters 86 and 88 as previously described to produce an output through and-gates 60 and 62 for triggering high speed delay timer 109. Until a predetermined time lapse of preferably 3 to 36 cycles has been measured by R-C timer 109 to produce an output, the upper input to and-gate 56 is inhibited. Since reclosure memories 104–107 are all in reset condition, the remaining inputs to and-gates 55 and 56 are enabled so that an output from timer 109 enables gate 56, which together with the enabling of gate 55, enables gate 65. This sets high speed reclosure memory 104 and also enables and-gate 83 to actuate a magnet driver through line 41 to module 16 which initiates a closure of the breaker through lines 25 and 26 to relay 24. When the breaker closes, ground is removed from line 29 and placed on line 32 from isolation module 16 by the actuation of isolation relay 152 (FIG. 5), and this resets permissive trip memory inverters 91 and 92 which inhibits and-gate 65, preventing any further high speed recloses.

Delayed recloses are controlled by and-gate 75 and the four and-gates 68–71 that enable and-gate 75. Every trip of the breaker triggers first delay R-C timer 110 via contacts memory inverters 86 and 88 and and-gates 60 and 62. The output from timer 110 delays a first delay reclose for a preselected interval of from 3 to 60 seconds by inhibiting the lower input to and-gate 68 for such interval.

Either the line must be dead or the bus hot, or the line hot and the bus dead to permit delay recloses. From the line and bus analyzer, hot and dead line conditions are represented respectively in lines 44 and 45 and input to and-gates 57 and 58. Hot and dead bus conditions are represented respectively in lines 46 and 48, and also input to and-gates 57 and 58. The outputs of and-gates 57 and 58 enable and-gate 66 for appropriate line and bus conditions, and through inverter 95, the output is applied to the upper input of and-gate 70.

Through output 38 from isolation module 16, every automatic trip sets bi-stable inverters 93 and 94 of the automatic trip memory as described above. The output from such memory enables the lower input to and-gate 70 to open and-gate 70. Through output 37 from isolation module 16, absence of a GFF inhibition signal enables the upper input to and-gate 71. If and-gate 65 is not enabled, no high speed closure is in progress, and the lower input to and-gate 69 is enabled.

Since flip-flop 107 is not set, because there has not been a synchrocheck reclosure, the lower input to and-gate 71 is enabled. The upper input to and-gate 68 is enabled by flip-flop 106 functioning as a second delay memory. Thus, all four and-gates 68–71 are enabled after the output from first delay timer 110 is applied at the lower input of and-gate 68. This event enables and-gates 75 and 83 to initiate a reclosure of the circuit breaker through relay 24 as previously described.

The enabling of the and-gates 75 and 83 for a first delayed reclosure also sets first delay memory flip-flop 105 to remember the first delayed reclosure attempt. The setting of first delayed memory flip-flop 105 inhibits and-gate 62 to prevent any further triggering of first delayed timer 110 and also enables and-gate 64 so that if the first delayed reclosure attempts result in another automatic trip of the breaker, second delayed timer element 111 is triggered for a second delayed reclosure.

A second delayed reclosure is effected in a manner similar to that described above for a first delayed reclosure except that upon initiation of a second delayed reclosure, flip-flop 105 is set in memory of the attempted first delayed reclosure and the delay interval is measured by the output from second delay timer 111. Setting of second delay timer 111 inhibits and-gate 75 during a predetermined interval after which and-gate 75 is enabled if appropriate circumstances have enabled delay and-gates 68–71 as previously described. A second delay reclosure is actuated through and-gates 75 and 83 as previously described. Output from enabled and-gate 75, through and-gate 80, sets second delay memory flip-flop 106 to inhibit any automatic recloses other than a synchrocheck reclose.

A synchrocheck reclosure occurs whenever and-gates 72 and 73 are enabled. The inputs to these and-gates include a signal in line 47 from line bus analyzer 15 representing that the breaker is open and both the line and the bus are hot and in phase which enables the lower input of and-gate 72. A signal in line 37 from isolation module 16 represents that no GFF inhibition signal is present to enable the lower input of and-gate 73, the assertion output from the bi-stable inverters 93 and 94 of the automatic trip memory enables the upper input of and-gate 73, and an output from synchrocheck memory flip-flop 107 representing that no synchrocheck reclosure has occured enables the upper input of and-gate 72. Thus, after an automatic trip in the absence of a GFF inhibition signal, and before any previous synchrocheck reclosure, if the line and the bus are both hot and in phase, and-gates 72 and 73 are both enabled, and through inverter 99, and-gate 84 is enabled to initiate a reclosure of the circuit breaker by relay 24, through line 41 to isolation module 16, as previously described. At the same time, synchrocheck memory flip-flop 107 is set to inhibit the upper input to and-gate 72 to prevent further synchrocheck reclosures. If the breaker successfully closes, the synchrocheck memory is reset.

Each time the breaker closes, reset delay timer 108 is set through line 29 and inverter 85. At the end of its predetermined interval, timer 108 causes an R–C network in module 16 between lines 31 and 33 to produce a 20 microsecond pulse in line 33 through inverter 87. This passes through and-gate 50 and produces a ground pulse on inverter 89 which causes resetting of the four reclosure memory flip-flops 104–107 via and-gates 76, 78, 79, 81, and 82. Each time the breaker trips, ground is supplied to reset timer 108 from contact memory inverters 86 and 88, to recycle and reset timer 108 in preparation for another reclosing. And-gate 50 inhibits resetting of the four reclosure memory flip-flops 104 during the interval that timer 108 is recycled by reopening of the breaker.

When automatic reclosure is not achieved, a supervisory reclosure can be made with the illustrated logic system. A supervisory reclosure is initiated by an input in line 20 to isolation module 16. This actuates an isolation relay to provide an output in line 39 from module 16 signifying a supervisory reclosure.

All the conditions of and-gate 74 and 77 must be met for a supervisory reclosure. An output in line 39 from module 16 enables the lower input of and-gate 77, and such gate is opened if and-gate 74 is enabled. The lower input to and-gate 74 is enabled by the supervisory antipump memory inverters 97 and 98 not being set, and power element conditions enable the upper input to and-gate 74. Such conditions include that the line is dead, the bus is dead, or the line and the bus are both hot and in phase. From the line and bus analyzer 15, a dead line is signified in line 45 to enable the upper input to and-gate 74 via and-gate 59 and or-gate 49. A dead bus is signified in line 48 from line and bus analyzer 15 to enable the upper input to and-gate 74 via and-gate 59 and or-gate 49. An output in line 47 from line and bus analyber 15 signifies that the breaker is open and the line and the bus are both hot and in phase, and this enables the upper input to and-gate 74 via or-gate 49. Thus, if line conditions enable and-gate 74, and the supervisory close has been called for, and-gate 77 is also enabled to initiate reclosure through and-gate 84 and line 41 as previously described. A successful supervisory reclosure reset reclosure memory flip-flops 104–107 via and-gate 76, 78, 19, 81, and 82.

When the supervisory reclosure input contacts close, it is necessary that only one close of the circuit breaker be allowed per operation of the contacts. Otherwise, if the contacts remain closed too long the breaker would close each time the other conditions for supervisory close were fulfilled, setting up a pumping situation. Therefore, a bi-stable anti-pump memory is provided to recognize the fact that a supervisory close command has been executed. This memory is formed of a pair of inverters 97 and 98 connected in a bi-stable manner, and it inhibits further operation of the breaker until the supervisory close contacts open and close again.

When the circuit breaker closes in response to a supervisory reclosure, this condition is noted in line 32 from module 16, to line 43 at the line bus analyzer 15, and to and-gate 54. This enables and-gate 54 to set the bi-stable inverters 97 and 98 of the anti-pump memory. Setting of bi-stable inverters 97 and 98 inhibits the lower input of and-gate 74, thus preventing further reclosures until the supervisory contacts are restored. This prevents successive supervisory reclosures attempts from manually holding the supervisory reclosure input 20 for too long. Inverter 96 resets the bi-stable memory inverters 97 and 98 upon restoration of the supervisory closure input 20 to the open or unasserted position.

The supervisory close operation also produces an output in line 35 from isolation module 16 for a delayed interval of preferably about one second. This enables and-gate 67 for the delay interval so that if an automatic or permissive trip, occurs while contacts are closed in response to a supervisory close in input 20, or for a predetermined interval thereafter, the second delayed reclosure memory 106 is set from the output of and-gate 67 to prevent any automatic reclosing on a fault.

Through inverters 100–103 indicator lamps 112–115 are respectively energized in response to the setting of reclosure memory flip-flops 104–107. Inspection of lamps 112–115 indicates automatic reclosure attempts by the system.

A reset input in line 23 to module 16 produces an output in line 40 that resets all the memory elements of the system. Permissive and auto-trip memories are reset through and-gates 52, 51, and 53, and reclosure memories are reset through and-gates 78, 79, 81, and 82.

The inventive system preferably uses a programming plug having means for receiving input signals and means for connecting with the system through the connectors schematically illustrated in lines 17–23, 11 and 12, and the lines leading to isolation transformers 13 and 14. The programming plug contains wiring that enables or inhibits various options provided in the system. The programming plug can connect with the system at points other than those illustrated as convenient or desirable for interaction with the system to modify optional features. Such operational features include no high speed reclosure, one delayed reclosure only, no delayed reclosure, no synchro-check reclosure, reclosing on dead-line-hot-bus only, reclosing on dead-bus-hot-line only, and other variations as desired in power transmission systems and known to those skilled in the art. By substituting or rewiring the programming plug, the alternations in the system's logic are readilly accomplished.

The programming plug's points of connection with the system also allow convenient testing or exercising of the logic network with the simulator. Such a simulator preferably includes means for introducing AC voltages representing line and bus conditions, and breaker and trip signals to the logic network through the same connectors normally served by the programming plug. Switches in the simulator control the inputs for testing, adjusting, and repairing the logic system.

Figure 3:
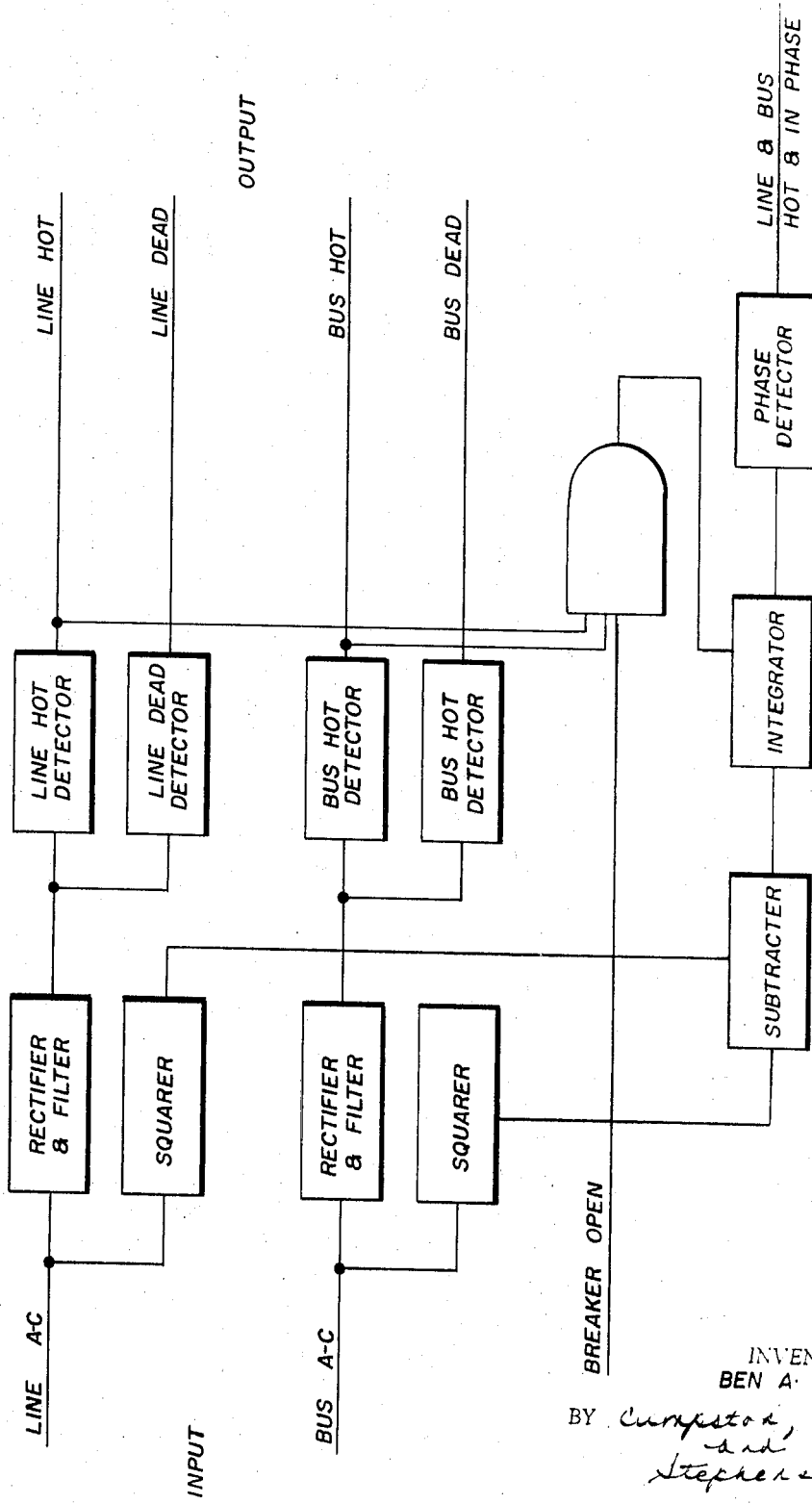
FIG. 3 shows a simplified logic diagram for the line and bus analyzer of the system shown in FIGS. 2A and 2B.
Figure 4:
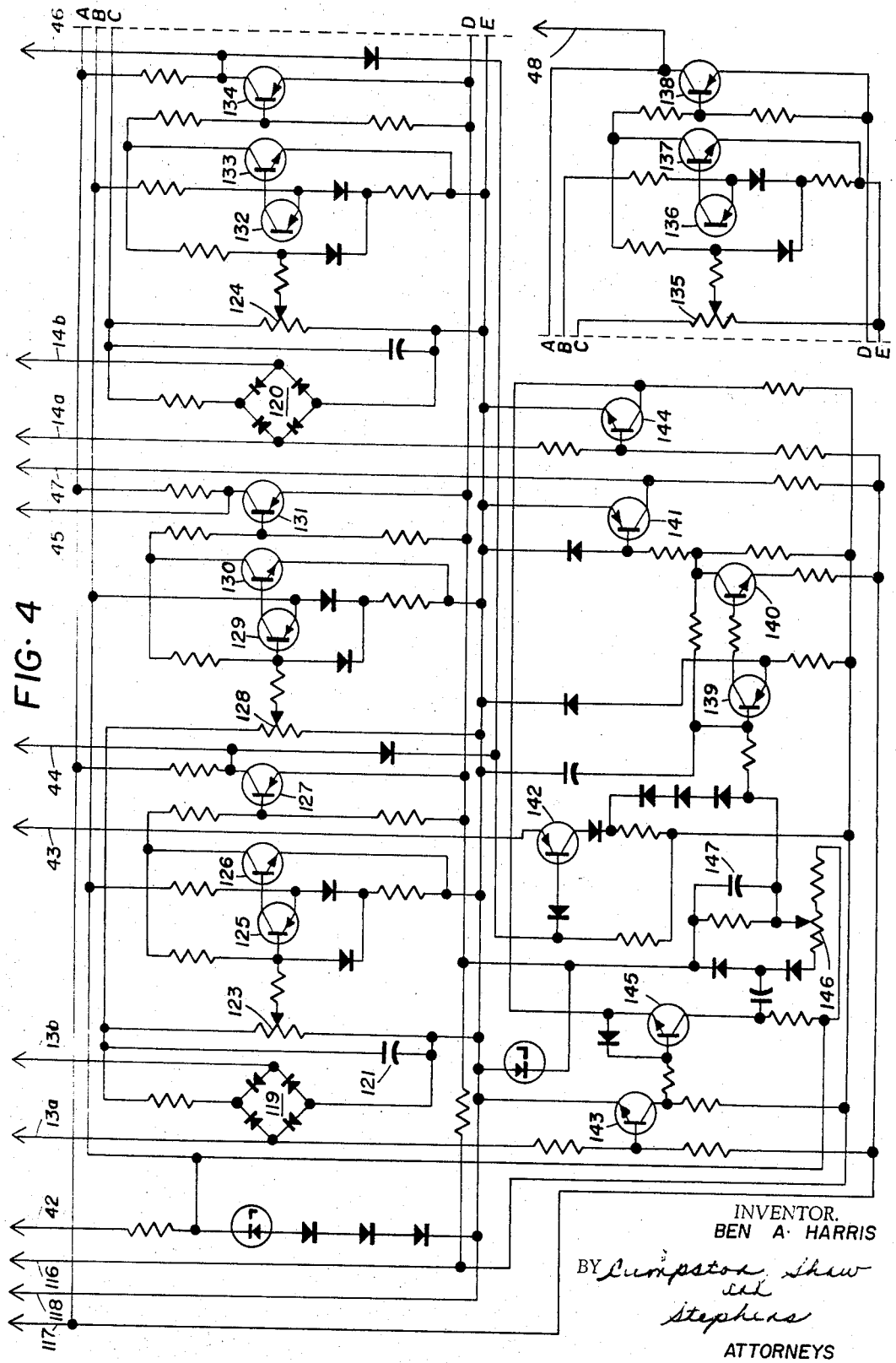
FIG. 4 shows a complete schematic logic diagram for the analyzer of FIG. 3.

The line and bus analyzer 15 is shown schematically in the block line diagram of FIG. 3, and its circuitry is fully shown in the circuit diagram of FIG. 4. The inputs to analyzer 15 at the left of FIG. 3 are line AC, bus AC, and a signal representing the circuit condition of the PCB. Line and bus AC signals are rectified and filtered and detector circuits having adjustable thresholds produce output signals for a hot line, a dead line, a hot bus, and a dead bus, as shown. Since "hot" and "dead" outputs are controlled by separately adjustable thresholds, intermediate potentials for the line and bus when voltage is dropping and motors are slowing down can be excluded from the logic to prevent reclosures under such conditions. Prior are equipment has made only two-valued decisions in this regard so that all the possible voltages of the line and bus were divided into either "hot" or "dead" by a single threshold.

For phase comparison in anlyzer 15, the line and bus AC are each squared, and the two square wave signals are substracted to produced pulses proportional to the phase difference between the two AC inputs. The subtracted pulses are then intergrated, and if the breaker is open and the line and bus are both hot, the integrated output is fed to an adjustable phase decision circuit which produces an output if the phase difference is sufficiently small. The details of this circuitry are best shown in FIG. 4.

The inputs and outputs to analyzer 15 are shown across the top of FIG. 4. Line AC from transformer 13 is input through lines 13a and 13b, and bus AC from transformer 14 is input through lines 14a and 14b. The position of the PCB is input through line 43. High voltage DC is input in line 42; inputs 116 and 117 provide lower voltage, negative and positive DC; and line 118 is common. The outputs of analyzer 15 represent line conditions as follows: a line 44 output signals a hot line; a line 45 output signals a dead line; a line 46 output signals a hot bus; a line 48 output signals a dead bus; and a line 47 output represents that the breaker is open and the line and bus are both hot and in phase. These outputs are provided in the circuitry described below.

The line and bus AC voltages are respectively rectified in bridges 119 and 120 and filtered by respective capacitors 121 and 122, and respective potentiometers 123 and 124 determine the threshold setting for hot line and hot bus decisions. Decision circuits for hot line, dead line, hot bus, and dead bus, are arranged along the upper half of the circuit illustrated in FIG. 4. Three transistors 125, 126, and 127 form a hot line decision circuit with a feedback loop between the collector of transistor 126 and the base of transistor 125 which provides one or two volts hysteresis. The setting of potentiometer 123 controls the threshold for such hot line decision circuit to produce a hot line output signal in line 44.

Similarly, through the adjustable setting of potentiometer 128, a dead line decision circuit formed of transistors 129, 130, and 131 is arranged with a feedback loop from the collector of transistor 130 to the base of transistor 120 for producing a dead line output signal in line 45. The hot bus decision circuit is formed of transistors 132, 133, and 134, with a feedback loop between the collector of transistor 133 and the base of 132. By adjustment of potentiometer 124, the threshold of this circuit is set to produce an output representing a hot bus in line 46. By adjustment of the lower threshold of the bus at potentiometer 135, a dead bus decision circuit is set. Such circuit is set. Such circuit is formed by transistors 136, 137, and 138, arranged with a feedback loop from the collector of transistor 137 to the base of transistor 136 to produce an output representing a dead bus in line 48.

The phase decision circuitry is shown in the lower left portion of the circuit diagram of FIG. 4. A phase decision circuit is formed by transistors 139, 140, and 141 arranged with a feedback loop between the collector of transistor 140 and the base of transistor 139. This phase decision circuit furnishes an output in line 47 representing that the line and the bus are both hot and in phase. Transistor 142 inhibits the phase decision circuit unless several conditions are met. Thus, if the PCB input in line 43 to transistor 142 represents that the circuit breaker is open, and the line and the bus are both hot as represented in lines 44 and 46, transistor 142 conducts to enable the phase decision circuitry. The logic of this arrangement is illustrated in FIG. 3 by the and-gate enabling the integrator.

The line and bus AC inputs are converted to square waves by transistors 143 and 144 respectively and are subtracted by transistor 145 in such a way that the width of the output pulses from the collector of transistor 145 is proportional to the phase difference of the two AC inputs. These pulses from transistor 145 are coupled to an integrating network including potentiometer 146 and integrating capacitor 147 to form a charge on capacitor 147 proportional to the phase difference. The output of capacitor 147 is applied to transistor 139 of the phase decision circuit along with the previously described enabling signal of transistor 142. Only if all the conditions are present to enable transistor 142, and the phase difference is sufficiently small, will the phase decision circuitry produce an output in line 47 representing that the line and the bus are both hot and in phase.

Other features, advantages and other specific embodiments of this invention will be apparent to those exercising ordinary skill in the pertinent art after considering the foregoing disclosure.

I claim:
1. A system for controlling automatic reclosure of a power circuit breaker electrically connected between first and second power elements, said system comprising in electrical interconnection:
   means for input to said system of a signal representing the circuit state of said circuit breaker;
   means for input to said system of a trip circumstance signal representing whether a trip of said circuit breaker was under circumstances allowing automatic reclosure;
   trip memory bi-stable means set in response to said trip circumstance signal;
   reclosure memory bi-stable means set in response to a reclosure attemept by said system; and
   and-gate means for initiating automatic reclosure of said circuit breaker if:
      said circuit breaker signal represents that said circuit breaker is open; and
      said trip memory bi-stable means is set in response to said trip circumstance signal representing that automatic reclosure is allowable; and
      said reclosure memory bi-stable means is not set in response to a previous automatic reclosure attempt by said system.

2. The system of claim 1 wherein both said trip memory bi-stable means and said reclosure memory bi-stable means are reset by said circuit breaker signal representing that said circuit breaker is closed.

3. The system of claim 1 wherein said circuit breaker input means includes a relay having transfer contacts, and means are connected to said contacts for inhibiting the setting of said trip memory bi-stable means except when both of said contacts are open.

4. The system of claim 1 including:
   means for input to said system of a signal to inhibit said automatic reclosure;
   and wherein said and-gate means for initiating automatic reclosure also requires:
      that said inhibit signal is not present.

5. The system of claim 1 including:
   R-C means for delaying by a predetermined interval the initiation of a reclosure of said circuit breaker;
   and wherein said and-gate means for initiating automatic reclosure also requires:
      that said predetermined interval has elapsed.

6. The system of claim 5 including:
   means for input to said system of signals representing the electrical conditions of said first and second power elements;
   and wherein said and-gate means for initiating automatic reclosure also requires:
      that said power element signals represent that one of said power elements is hot and one of said power elements is dead.

7. The system of claim 5 including:
   means for input to said system of signals representing the electrical conditions of said first and second power elements;
   means for comparing the phase relationship of said first and second power elements;
   said reclosure memory bi-stable means includes first bi-stable means set in response to a reclosure attempt by said system at the expiration of said predetermined interval and second bi-stable means set in response to a reclosure attempt by said system after a phase comparison of said first and second power elements;
   said first-mentioned and-gate means for initiating automatic reclosure of said circuit breaker requires:
      that said first bi-stable means is not set in response to a previous automatic reclosure attempt by said system at the expiration of said predetermined interval;
   and including second and-gate means for initiating automatic reclosure of said circuit breaker if:
      said circuit breaker signal represents that said circuit breaker is open; and
      said trip memory bi-stable means is set in response to said trip circumstance signal representing that automatic reclosure is allowable; and
      said second bi-stable means is not set in response to the previous automatic reclosure attempt by said system after said phase comparison; and
      said power element signals represent that said first and second power elements are both hot and in phase.

8. The system of claim 7 including R-C delay means to afford an interval for said phase comparison.

9. The system of claim 7 including:
   means for input to said system of a signal to inhibit said automatic reclosure;
   and wherein both said first-mentioned and-gate means and said second and-gate means also require:
      that said inhibit signal is not present.

10. The system of claim 7 including:
    means for input to said system of a signal to enable a high speed automatic reclosure of said circuit breaker;
    said R-C means makes said predetermined interval relatively short;
    and wherein said first-mentioned and-gate means initiates said high speed automatic reclosure with the additional requirement:
       that said high speed enabling signal is present.

11. The system of claim 1 including:
    means for input to said system of signals representing the electrical conditions of said first and second power elements;
    means for comparing the phase relationship of said first and second power elements;
    and wherein said and-gate means for initiating automatic reclosure also requires:
       that said power element signals represent that said first and second power elements are both hot and in phase.

12. The system of claim 1 including means for indicating the setting of said reclosure memory bi-stable means.

13. The system of claim 1 including:
    means for input to said system of signals representing the electrical conditions of said first and second power elements;
    means for input to said system of a signal representing a supervisory reclosure; and or-gate means for initiating said supervisory reclosure when said circuit breaker signal represents that said circuit breaker is open, if:
said power element signals represent that either of said power elements is dead; or
said power element signals represent that both of said power elements are hot and in phase.

14. The system of claim 13 including:
anti-pump memory bi-stable means set by coincidence of said supervisory reclosure input signal and said circuit breaker signal representing that said circuit breaker is closed, and means for preventing initiation of subsequent reclosures of said circuit breaker for a predetermined interval after said setting of said anti-pump memory bi-stable means.

15. The system of claim 1 including relay means for actuating said automatic reclosure.

16. The system of claim 1 including DC power supply means adapted to be energized by power station batteries.

17. The system of claim 1 wherein:
said circuit breaker input means includes a relay;
and including relay memory bi-stable means set in response to said circuit breaker input relay and arranged to avoid the effects of chatter of said relay.

18. The system of claim 1 including a related circuit breaker and means for controlling the circuit condition of said related circuit breaker as a function of said circuit breaker signal.

19. The system of claim 1 including a related circuit breaker and means for initiating opening of said related circuit breaker as a function of said circuit breaker signal representing that said first-mentioned circuit breaker is closed.

20. The system of claim 1 including connector means disposed in said system and a plug having terminals engageable with said connector means and means for receiving said input signals, said terminals being connectable in a variety of ways to eliminate predetermined ones of said and-gate conditions.

21. The system of claim 20 including a simulator having terminals engageable with said connector means, said simulator including means for generating signals corresponding to said input signals and switches for selectively connecting said signal generating means with said system.

22. The system of clam 1 including:
first R-C means for delaying by a first predetermined interval the initiation of a reclosure of said circuit breaker;
second R-C means for delaying by a second predetermined interval the initiation of a reclosure of said circuit breaker;
said reclosure memory bi-stable means includes first bi-stable means set in response to a reclosure attempt by said system at the expiration of said first predetermined interval and second bi-stable means set in response to a reclosure attempt by said system at the expiration of said second predetermined interval;
means for input to said system of signals representing the electrical conditions of said first and second power elements;
said first-mentioned and-gate means for initiating automatic reclosure also requires:
that said first predetermined interval has elapsed; and
that said first bi-stable means is not set in response to a previous automatic reclosure attempt by said system at the expiration of said first predetermined interval.
and including second and-gate means for initiating automatic reclosure if:
said circuit breaker signal represents that said circuit breaker is open; and
said trip memory bi-stable means is set in response to said trip circumstance signal representing that automatic reclosure is allowable; and
said second bi-stable means is not set in response to a previous automatic reclosure attempt by said system at the expiration of said second predetermined interval; and
said power element signals represent that one of said power elements is hot and one of said power elements is dead.

23. The system of claim 22 wherein both said trip memory bi-stable means and said reclosure memory bi-stable means are reset by said circuit breaker signal representing that said circuit breaker is closed.

24. The system of claim 22 including:
means for input to said system of a signal to inhibit automatic reclosure;
and wherein both said first mentioned and-gate means, and said second and-gate means also require:
that said inhibit signal is not present.

25. The system of claim 22 including:
means for input to said system of a signal to enable a high speed automatic reclose;
said first R-C means makes said first predetermined interval relatively short;
and wherein said first mentioned and-gate means initiates said high speed automatic reclosure with the additional requirement:
that said high speed enabling signal is present.

26. The system of claim 22 wherein:
said first and second R-C means make said first predetermined interval shorter than said second predetermined interval;
said first-mentioned and-gate means for initiating automatic reclosure also requires:
that said power element signals represent that one of said power elements is hot and one of said power elements is dead;
and said second and-gate means for initiating automatic reclosure also requires:
that said first bi-stable means is set in response to an automatic reclosure attempt by said system at the expiration of said first predetermined intervals.

27. The system of claim 22 including:
means for input to said system of a signal representing a supervisory reclosure;
and or-gate means for initiating said supervisory reclosure when said circuit breaker signal represents that said circuit breaker is open, if:
said power element signals represent that either of said power elements is dead; or
said power element signal represent that both of said power elements are hot and in phase.

28. The system of claim 27 including anti-pump memory bi-stable means set by coincidence of said supervisory reclosure input signal and said circuit breaker signal representing that said circuit breaker is closed, and means for preventing initiation of subsequent reclosures of said circuit breaker for a predetermined interval after said setting of said anti-pump memory bi-stable means.

29. The system of claim 22 including:
means for input to said system of a signal representing a reset;
means for resetting said trip memory bi-stable means and said reclosure memory bi-stable means in response to said reset signal.

30. The system of claim 22 including means for indicating the setting of said reclosure memory bi-state means.

31. The system of claim 22 including:
means for comparing the phase relationship of said first and second power elements;
said reclosure memory bi-stable means includes third bi-stable means set in response to a closure attempt by said system after a phase comparison of said first and second power elements;

and including third and-gate means for initiating automatic reclosure of said circuit breaker if:
said circuit breaker signal represents that said circuit breaker is open; and
said trip memory bi-stable means is set in response to said trip circumstance signal representing that automatic reclosure is allowable; and
said third bi-stable means is not set in response to a previous automatic reclosure attempt by said system after said phase comparison; and
said power element signals represent that said first and second power elements are both hot and in phase.

32. The system of claim 22 including:
third R-C means for delaying a third predetermined interval the initiation of a reclosure of said circuit breaker;
said reclosure memory bi-stable means includes third bi-stable means set in response to a previous reclosure attempt by said system at the expiration of said third predetermined interval;
and including third and-gate means for initiating automatic reclosure if:
said circuit breaker signal represents that said circuit breaker is open; and
said trip memory bi-stable means is set in response to said trip circumstance signal representing that automatic reclosure is allowable; and
said second bi-stable means is set in response to an automatic reclosure attempt by said system at the expiration of said second predetermined interval; and
said third bi-stable means is not set in response to an automatic reclosure attempt by said system at the expiration of said third predetermined interval; and
said power element signals represent that one of said power elements is hot and one of said elements is dead.

33. The system of claim 32 including:
means for input to said system of a signal to enable a high speed automatic reclose;
said first R-C means makes said first predetermined interval relatively short;
and wherein said first-mentioned and-gate means initiates said high speed automatic reclosure with the additional requirement:
that said high speed enabling signal is present.

34. The system of claim 33 wherein:
said second and third R-C means makes said second predetermined interval shorter than said third predetermined interval;
said second and-gate means for initiating automatic reclosure also requires:
that said power element signals represent that one of said power elements is hot and one of said power elements is dead;
and said third and-gate means for initiating automatic reclosure also requires:
that said second bi-stable means is set in response to an automatic reclosure attempt by said system at the expiration of said second predetermined interval.

35. The system of claim 34 including:
means for comparing the phase relationship of said first and second power elements;
said reclosure memory bi-stable means includes fourth bi-stable means set in response to a reclosure attempt by said system after a phase comparison of said first and second power elements;
and including fourth and-gate means for intiating automatic reclosure of said circuit breaker if;
said circuit breaker signal represents that said circuit breaker is open; and
said trip memory bi-stable means is set in response to said trip circumstance signal representing that automatic reclosure is allowable; and
said fourth bi-stable means is not set in response to a previous automatic reclosure attempt by said system after said phase comparison; and
said power element signals represent that said first and second power elements are both hot and in phase.

36. The system of claim 35 including:
means for input to said system of a signal representing a supervisory reclosure;
and or-gate means for initiating said supervisory reclosure when said circuit breaker signal represents that said circuit breaker is open, if:
said power element signals represent that either of said power elements is dead; or
said power element signal represents that both of said power elements are hot and in phase.

37. The system of claim 36 including anti-pump memory bi-stable means set by coincidence of said supervisory reclosure input signal and said circuit breaker signal representing that said circuit breaker is closed, and means for preventing initiation of subsequent reclosures of said circuit breaker for a predetermined interval after said setting of said anti-pump memory bi-stable means.

38. The system of claim 36 wherein all of said bi-stable means are reset by said circuit breaker signal representing that said circuit breaker is closed.

39. The system of claim 38 including R-C delay means to provide a predetermined reset interval and means for resetting said trip memory bi-stable means and said reclosure memory bi-stable means at the expiration of said predetermined interval if said circuit breaker signal continuously represents throughout said reset interval that said circuit breaker is closed.

40. The system of claim 38 including:
means for input to said system of a signal representing a reset;
means for resetting said trip memory bi-stable means and said reclosure memory bi-stable means in response to said reset signal.

41. The system of claim 38 wherein said circuit breaker input means includes a relay having transfer contacts, and means are connected to said contacts for inhibiting the setting of said trip memory bi-stable means except when both of said contacts are open.

42. The system of claim 38 including means for indicating the setting of said reclosure memory bi-stable means.

43. The system of claim 38 including:
means for input to said system of a signal to inhibit automatic reclosure;
and wherein all of said and-gate means also require:
that said inhibit signal is not present.

44. The system of claim 38 including a related circuit breaker and means for controlling the circuit condition of said related circuit breaker as a function of said circuit breaker signal.

45. The system of claim 38 including a related circuit breaker and means for initiating opening of said related circuit breaker as a function of said circuit breaker signal representing that said first-mentioned circuit breaker is closed.

46. The system of claim 38 including connector means disposed in said system and a plug having terminals engageable with said connector means and means for receiving said input signals, said plug terminals being connectable in a variety of ways to eliminate predetermined ones of said and-gate conditions.

47. The system of claim 46 including a simulator having terminals engageable with said connector means, said simulator including means for generating signals corresponding to said input signals and switches for selectively connecting said signal generating means with said system.

48. The system of claim 47 including:

R–C delay means to provide a predetermined reset interval and means for resetting said trip memory bi-stable means and said reclosure memory bi-stable means at the expiration of said predetermined interval if said circuit breaker signal continuously represents throughout said reset interval that said circuit breaker is closed;

means for input to said system of a signal representing a reset;

means for resetting said trip memory bi-stable means and said reclosure memory bi-stable means in response to said reset signal;

said circuit breaker input means includes a relay having transfer contacts, and means are connected to said contacts for inhibiting the setting of said trip memory bi-stable means except when both of said contacts are open; and means for indicating the setting of said reclosure memory bi-stable means;

means for input to said system of a signal to inhibit automatic reclosure of said circuit breaker;

and wherein all of said and-gate means also require: that said inhibit signal is not present.

References Cited

UNITED STATES PATENTS 3,312,864  4/1967  Schwanenflugel _____ 317—23

LEE T. HIX, Primary Examiner

J. D. TRAMMELL, Assistant Examiner

U.S. Cl. X.R.

307—87; 317—33